(12) United States Patent
Lin et al.

(10) Patent No.: US 9,494,834 B2
(45) Date of Patent: Nov. 15, 2016

(54) ELECTRO-OPTICAL LIQUID CRYSTAL DEVICE

(71) Applicants: LIQXTAL TECHNOLOGY INC., Tainan (TW); National Chiao Tung University, Hsinchu (TW)

(72) Inventors: Yi-Hsin Lin, Zhubei (TW); Hung-Shan Chen, Taichung (TW)

(73) Assignees: LIQXTAL TECHNOLOGY INC., Tainan (TW); NATIONAL CHIAO TUNG UNIVERSITY, Hsinchu (TW)

( * ) Notice: Subject to any disclaimer, the term of this patent is extended or adjusted under 35 U.S.C. 154(b) by 32 days.

(21) Appl. No.: 14/170,843

(22) Filed: Feb. 3, 2014

(65) Prior Publication Data

US 2015/0138498 A1 May 21, 2015

(30) Foreign Application Priority Data

Nov. 15, 2013 (TW) .............................. 102141605 A (51) Int. Cl.
| | |
|---|---|
| *G02F 1/1347* | (2006.01) |
| *G02F 1/137* | (2006.01) |
| *G02F 1/1333* | (2006.01) |
| *G02F 1/1343* | (2006.01) |
| *G02F 1/29* | (2006.01) |

(52) U.S. Cl.
CPC ........... *G02F 1/13473* (2013.01); *G02F 1/137* (2013.01); *G02F 1/13471* (2013.01); *G02F 1/133377* (2013.01); *G02F 1/134309* (2013.01); *G02F 1/29* (2013.01); *G02F 2001/294* (2013.01)

(58) Field of Classification Search
CPC ............................. G02F 1/137; G02F 1/13473
See application file for complete search history.

(56) References Cited

U.S. PATENT DOCUMENTS

2007/0183293 A1* 8/2007 Murata ..................... G02F 1/29
369/112.02

* cited by examiner

*Primary Examiner* — Paisley L Arendt
*Assistant Examiner* — Edmond Lau
(74) *Attorney, Agent, or Firm* — Muncy, Geissler, Olds & Lowe, P.C.

(57) ABSTRACT

A liquid crystal (LC) lens comprises a first substrate, a first electrode structure, an electrically tunable LC layer structure, a second substrate and a second electrode structure, wherein the electrically tunable LC layer structure is arranged between the first substrate and the second substrate. The electrically tunable LC layer structure includes at least two LC layers stacked on top of one another, and each LC layer further includes at least one LC unit. In the stacked structure, at least one of the LC layers includes at least one partition unit to partition the LC layer into one or more LC units. The layout of the LC units of the upper LC layer differs from that of the lower LC layer. In the present invention, the shape and layout of the LC units are designed to provide better optical performance without changing the thickness of the liquid crystal lens.

19 Claims, 10 Drawing Sheets

ELECTRO-OPTICAL LIQUID CRYSTAL DEVICE

BACKGROUND OF THE INVENTION

1. Field of the Invention

The present invention relates to an element whose focus is electrically tunable, particularly to a liquid crystal lens whose refractive index is electrically tunable.

2. Description of the Related Art

With development of optical imaging technology, liquid crystal (LC) lenses are widely used in various imaging devices, such as electrically tunable glasses, cameras, projectors, and endoscopes. The conventional LC lens normally contains only a single LC unit, and the lens effect is achieved via the electrode design or thickness variation of the single LC unit. However, these technologies still have some limitations, which is why manufacturers are continually striving to develop improved design.

SUMMARY OF THE INVENTION

One objective of the present invention is to provide a liquid crystal lens, wherein the shape and layout of liquid crystal units are designed to provide better optical performance without changing the thickness of liquid crystal lens.

The present invention proposes a liquid crystal lens, which comprises a first substrate, a first electrode structure, an electrically tunable liquid crystal (LC) layer structure, a second substrate and a second electrode structure. The first electrode structure is arranged on the first substrate; and the second electrode substrate is arranged on the second substrate. The electrically tunable LC layer structure is arranged below the first substrate, and the electrically tunable LC layer structure includes at least two LC layers stacked one above one. Each LC layer further includes at least one LC unit. At least one of the stacked LC layers has at least one partition unit to separate the LC layer into one or more LC units. The layout of the LC units of the upper LC layer is different from that of the lower LC layer. The second substrate is arranged below the electrically tunable LC layer structure.

Below, the embodiments are described in detail in cooperation with the attached drawings to make easily understood the objectives, technical contents, characteristics and accomplishments of the present invention.

DETAILED DESCRIPTION OF THE INVENTION

The present invention proposes an LC lens, which comprises a first substrate, a first electrode structure, an electrically tunable LC layer structure, a second substrate and a second electrode structure. The electrically tunable LC layer structure is arranged between the first substrate and the second substrate and includes at least two LC layers stacked on top of one another. The layout of the LC units of the upper LC layer is different from that of the lower LC layer so as to achieve the goal of phase accumulation. Below, the embodiments are described in detail in cooperation with the drawings to exemplify the present invention. The embodiments, which are generated via equivalent substitution, modification or variation, are to be also included within the scope of the present invention, which is based on the claims stated below. Although many specific details are provided in the specification to fully demonstrate the present invention, the present invention can still work without some or all of these specific details. Besides, the well-known elements or steps are not described in the specification lest the present invention be limited unnecessarily. Identical or similar elements will be denoted with identical or similar symbols in the drawings. It should be noted that the drawings do not present the physical dimensions or quantities of elements but only schematically show the elements. Further, the unconcerned details are not necessarily fully depicted in the drawings less clearness and conciseness of the drawings be impaired.

Figure 1:
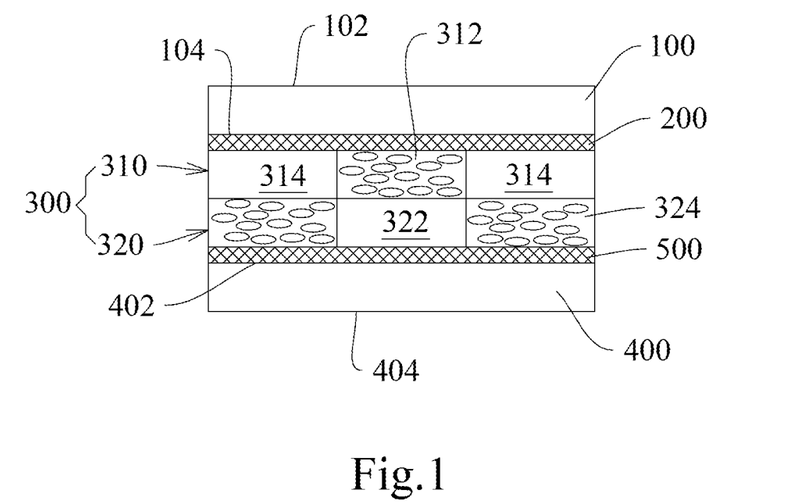
FIG. 1 is a sectional view schematically showing the structure of an LC lens according to one embodiment of the present invention.

FIG. 1 is a cross-sectional view schematically showing an LC lens structure according to one embodiment of the present invention. In this embodiment, the LC lens comprises a first substrate 100, a first electrode structure 200, an electrically tunable LC layer structure 300, a second substrate 400 and a second electrode structure 500, wherein the electrically tunable LC layer structure 300 is arranged between the first substrate 100 and the second substrate 400. In one embodiment, each of the first substrate 100 and the second substrate 400 can be made of a plastic material or a glass material. The electrically tunable LC layer structure 300 includes at least two LC layers stacked on top of one another, and each LC layer includes at least one LC unit. In the stacked structure, at least one of the LC layers has at least one partition unit to separate the LC layer into one or more LC units. In one embodiment, the electrically tunable LC layer structure 300 includes two LC layers 310 and 320 stacked one above one. As shown in FIG. 1, the LC layer 310 comprises LC unit 312 and partition unit 314; and the LC layer 320 has partition unit 322 and LC unit 324, wherein the partition unit 314 is positioned to surround the LC unit 312, and the LC unit 324 is positioned to surround the partition unit 322. Hence, in the stacked structure, the layout of the LC units 312 of the upper LC layer 312 is different from the layout of the LC units 324 of the lower LC layer 320. The first electrode structure 200 and the second electrode structure 500 are respectively arranged on the first substrate 100 and the second substrate 400 and separately drive the LC units 312 and the LC units 324 to work.

Figure 2A:
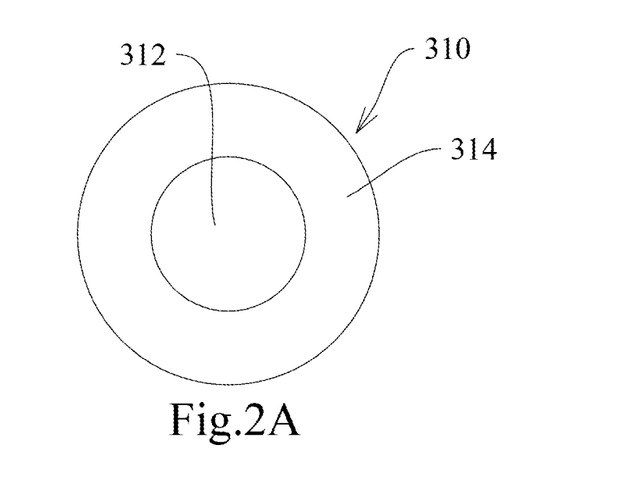
FIGS. 2A-2E diagrams schematically showing that the layout of the LC layer according to different embodiments of the present invention.
Figure 2B:
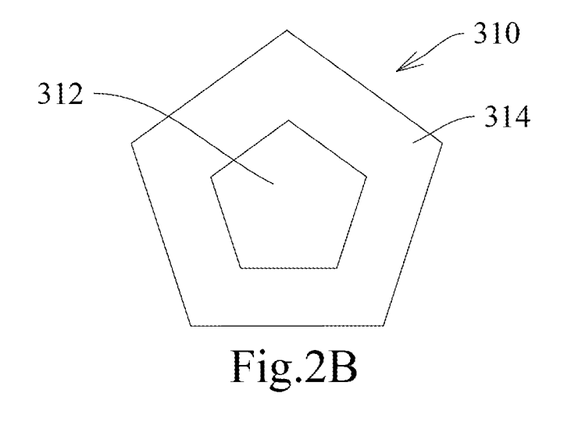
Figure 2C:
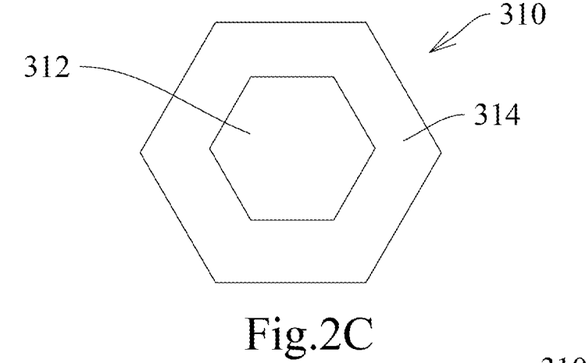
Figure 2D:
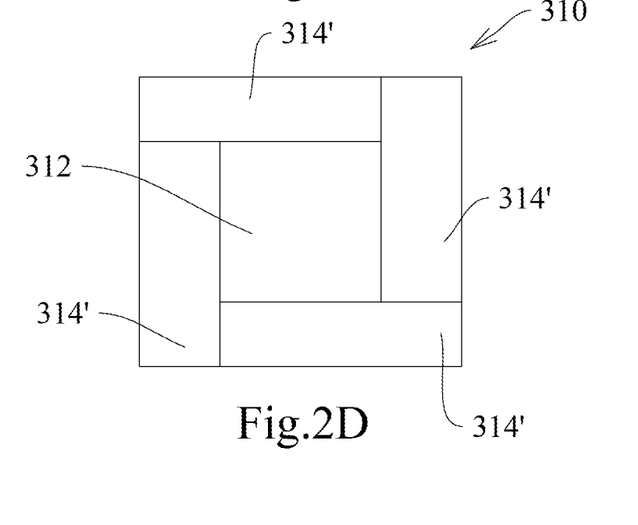
Figure 2E:
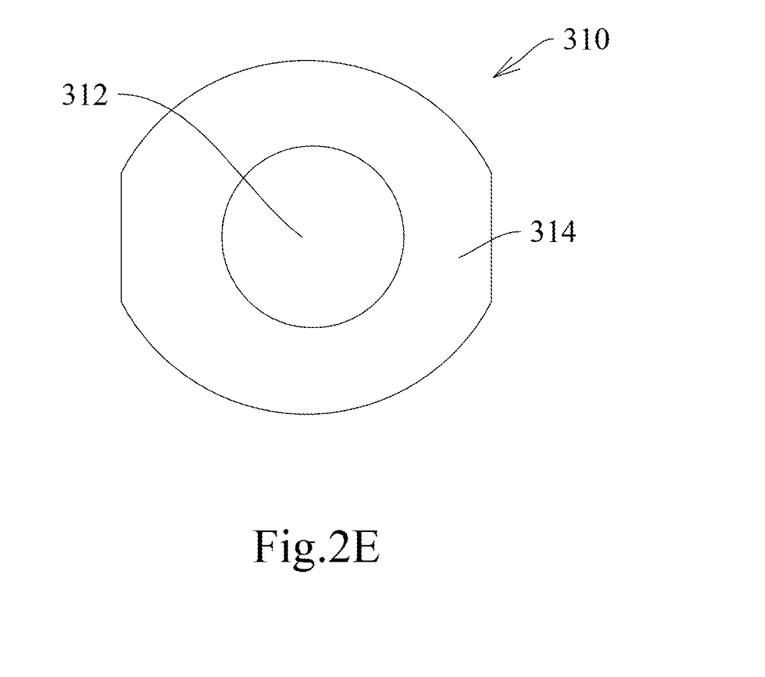

Continuing the above description, as illustrated in FIGS. 2A-2E, the partition unit is designed to surround the LC unit annularly like a ring according to various embodiments of the present invention. For example, in the LC layer 310, the LC unit 312 is in form of a circle (as shown in FIG. 2A), a polygon (as shown in FIGS. 2B-2D), or a combination thereof (as shown in FIG. 2E). Thus, the partition unit 314 is in form of a circular ring (as shown in FIG. 2A), a polygonal ring (as shown in FIGS. 2B-2D), or a combination thereof (as shown in FIG. 2E). In the present invention, the LC unit 312 is not limited to be in form of the polygons shown in the drawings but may be in form of other polygons. The partition unit 314 may be in form of any shape as long as the shape can match the shape of LC unit 312. In one embodiment, the ring-like partition unit 314 consists of several sub-partition units 314'. As shown in FIG. 2D, several sub-partition units 314' form a ring-like partition unit 314 surrounding the LC unit 312. In one embodiment, the partition units 314 are made of a plastic material or a glass material. In one embodiment, the partition unit 314 is a structure has different dielectric permittivities distributed thereon. For example, the partition unit 314 is made of an LC polymer film or made of more than two materials respectively having different dielectric permittivities. Although not depicted in the drawings, there should be channels for filling liquid crystal in the abovementioned LC units or partition units. It is a common knowledge familiar to the persons skilled in the art and will not be repeated herein.

Figure 3:
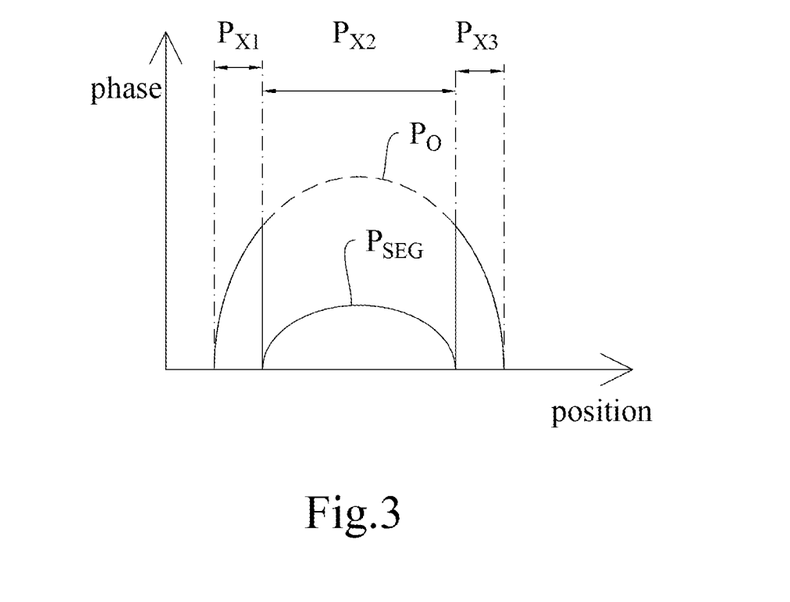
FIG. 3 is a diagram schematically showing the phase distribution of the structure of the embodiment shown in FIG. 1.

The first electrode structure 200 and the second electrode structure 500, which are respectively arranged on the first substrate 100 and the second substrate 400, function to control the electric field distribution of the LC unit. The LC unit contains a material with an electrically tunable refractive index. The LC units are made of at least one material selected from a group consisting of nematic liquid crystal, cholesteric liquid crystal, PDLC (Polymer Dispersed Liquid Crystal), BPLC (Blue Phase Liquid Crystal), and other materials whose refractivities are electrically tunable. Applying voltage to the first electrode structure 200 and the second electrode structure 500 can induce the distribution of refractive index in the electrically tunable LC layer structure 300 and generate a focusing effect. Refer to FIG. 3 for the working principle of the structure of the embodiment shown in FIG. 1, wherein the dotted curve $P_O$, which represents the phase profile required to achieve the originally designed lens effect, are divided into two parts called the segmental phase profiles, which are denoted by solid curves $P_{SEG}$ and respectively provided by the upper LC unit 312 and the lower LC unit 324. The phase profiles $P_{X1}$ and $P_{X3}$ are provided by the LC unit 324 in FIG. 1, and the phase profile $P_{X3}$ is provided by the LC unit 312 in FIG. 1. Therefore, the present invention is utilized to accumulate the phase profiles respectively provided by the LC units of different LC layers to achieve the phase profile realizing the originally designed lens effect.

Figure 4A:
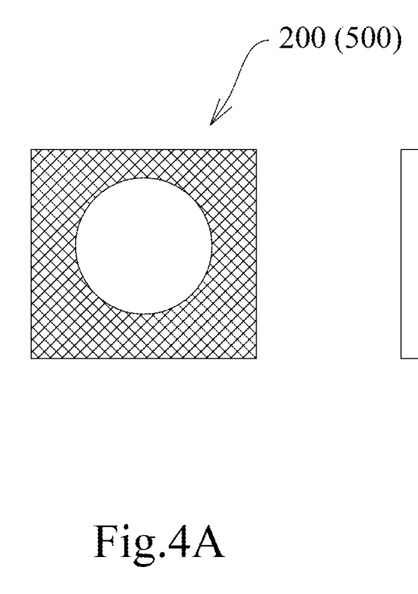
FIGS. 4A-4D are diagrams schematically showing the patterns of the electrode structures according to different embodiments of the present invention.
Figure 4B:
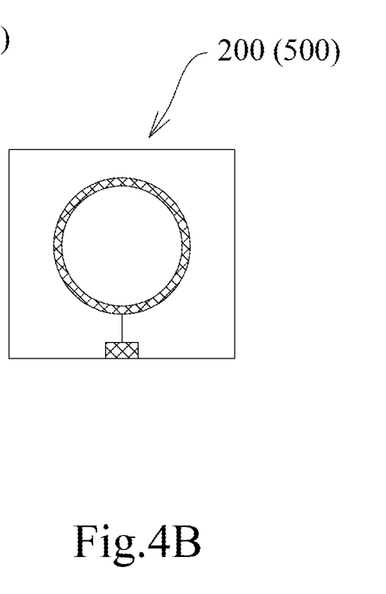
Figure 4C:
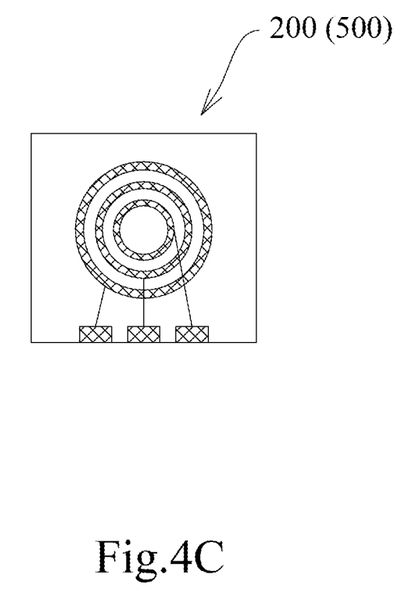
Figure 4D:
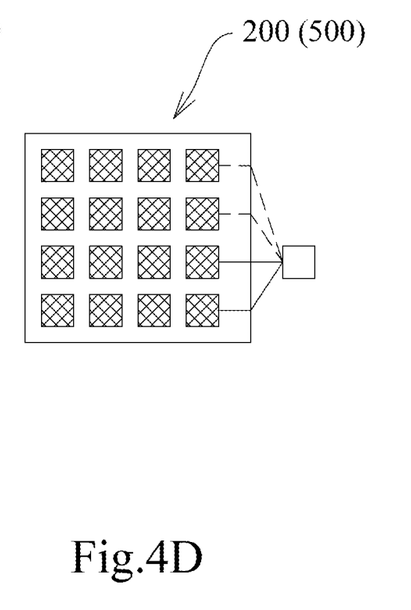

In another invention, as shown in FIG. 1, the first electrode structure 200 may be arranged on the top surface 102 or the bottom surface 104 of the first substrate 100, and the second electrode structure 500 may be arranged on the top surface 402 or the bottom surface 404 of the second substrate 400. In addition, refer to FIGS. 4A-4D and FIG. 1 for the patterns of the electrode structures. Each of the first electrode structure 200 and the second electrode structure 500 may be a circle electrode (as shown in FIG. 4A), a ring electrode (as shown in FIG. 4B), concentric ring electrode (as shown in FIG. 4C), pixel electrode (as shown in FIG. 4D), a sheet electrode (as shown in FIG. 1), or a polygon electrode. The first electrode structure 200 and the second electrode structure 500 may have an identical electrode structure or respectively have different electrode structures according to the design. It should be noted that patterns shown in FIGS. 4A-4D are only to exemplify the patterns of the electrode structures. In the present invention, the electrode structures are not limited by FIGS. 4A-4D but may have other different patterns.

Figure 5A:
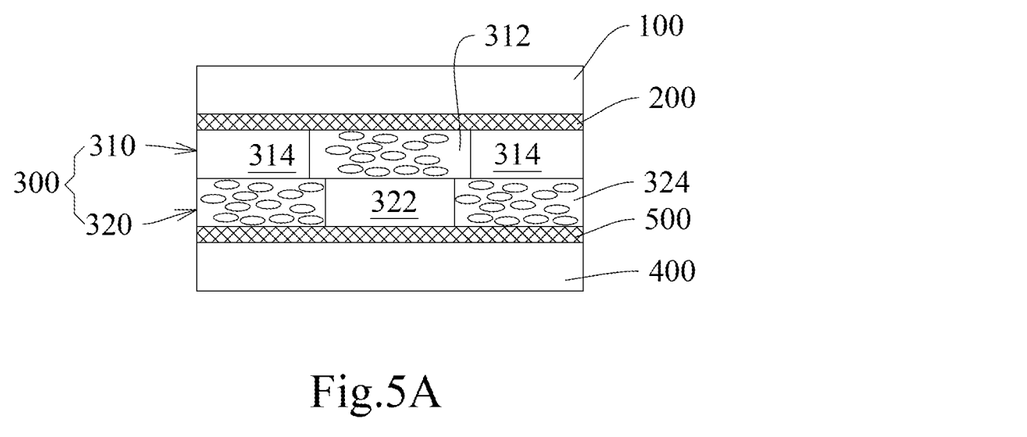
FIGS. 5A-5C are sectional views schematically showing the structures of LC lenses according to different embodiments of the present invention.
Figure 5B:
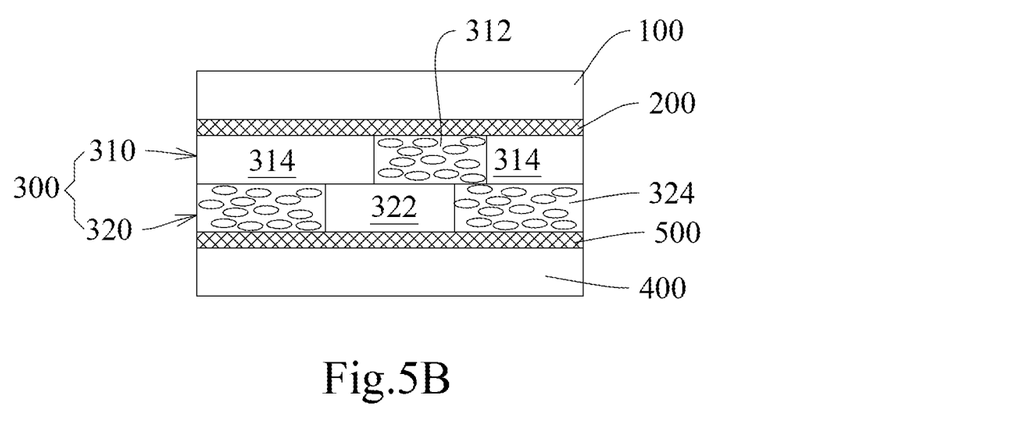
Figure 5C:
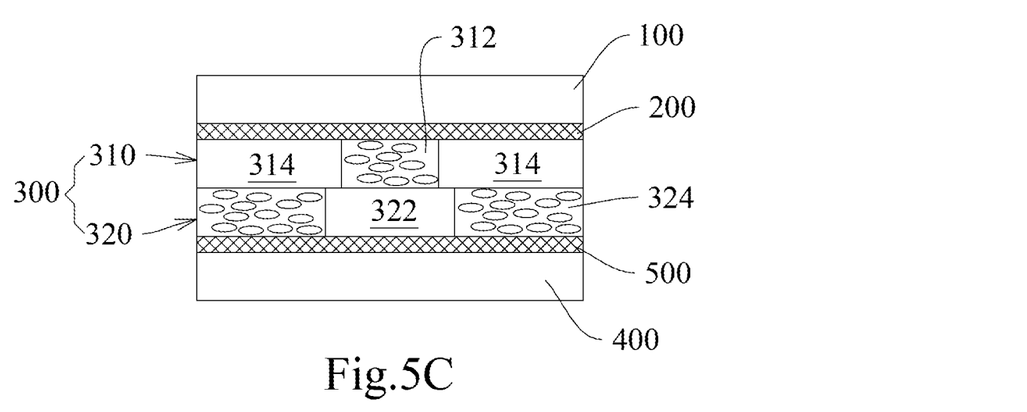

Different phase profile designs can be realized via adjusting the overlap regions of the LC units of the upper and lower LC layers. In one embodiment, the LC units of the upper LC layer partially superimpose the LC units of the lower LC layer (as shown in FIG. 5A and FIG. 5B). In another embodiment, the LC units of the upper LC layer do not overlap the LC units of the lower LC layer (as shown in FIG. 1 and FIG. 5C). In yet another embodiment, the LC units of the upper and lower LC layers have an identical thickness. In further embodiment, the LC units of the upper and lower LC layers respectively have different thicknesses. Therefore, in the present invention the shapes and positions of the LC units can be designed to provide better lens performance without changing the total thickness of the lens.

Figure 6:
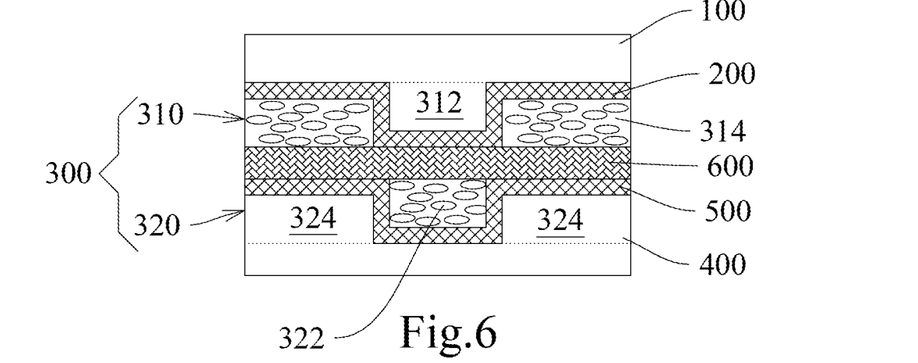
FIG. 6 is a sectional view schematically showing the structure of an LC lens according to another embodiment of the present invention.
Figure 7A:
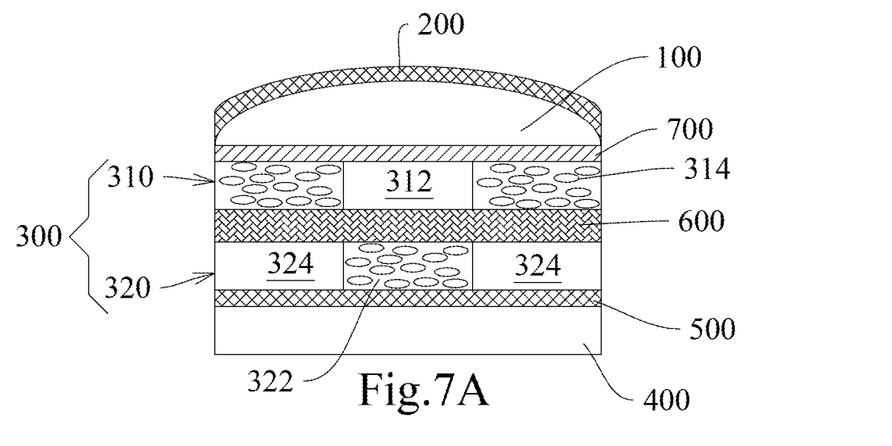
FIG. 7A and FIG. 7B are sectional views schematically showing the structures of LC lenses according to different embodiments of the present invention.
Figure 7B:
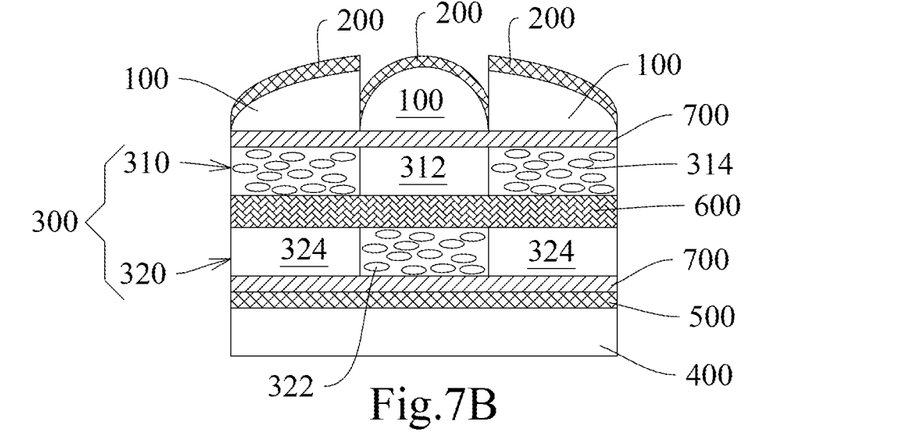

Refer to FIG. 6. In another embodiment, the LC lens of the present invention further comprises a separation layer 600 arranged between two stacked LC layers 310 and 320. The separation layer 600 is made of a plastic material, a glass material or an LC polymer film. In one embodiment, the separation layer 600 has different dielectric permittivities distributed thereon to orientate the electric field. In one embodiment, the partition units 314 or 324 can be fabricated with the first substrate 100 and/or the second substrate 400 into a one-piece component, wherein the substrate is fabricated in an appropriate method to have desired patterns for shaping the LC units and limiting the sizes and positions of the LC units. Refer to FIG. 7A and FIG. 7B. In one embodiment, the LC lens of the present invention further comprises at least one alignment layer 700 arranged in the electrically tunable LC layer structure 300 to align the liquid crystal in the LC units. In one embodiment, the surface of the first substrate 100 and/or the second substrate 400 is curved, whereby the electrode structure on the substrate is curved also. The electric field distribution can be adjusted via modifying the curvature of the curved surface of the substrate. As shown in FIG. 7A, the surface of the first substrate 100 is curved to have a single curvature. As shown in FIG. 7B, the surface of the first substrate 100 is curved to have different curvatures.

Figure 8A:
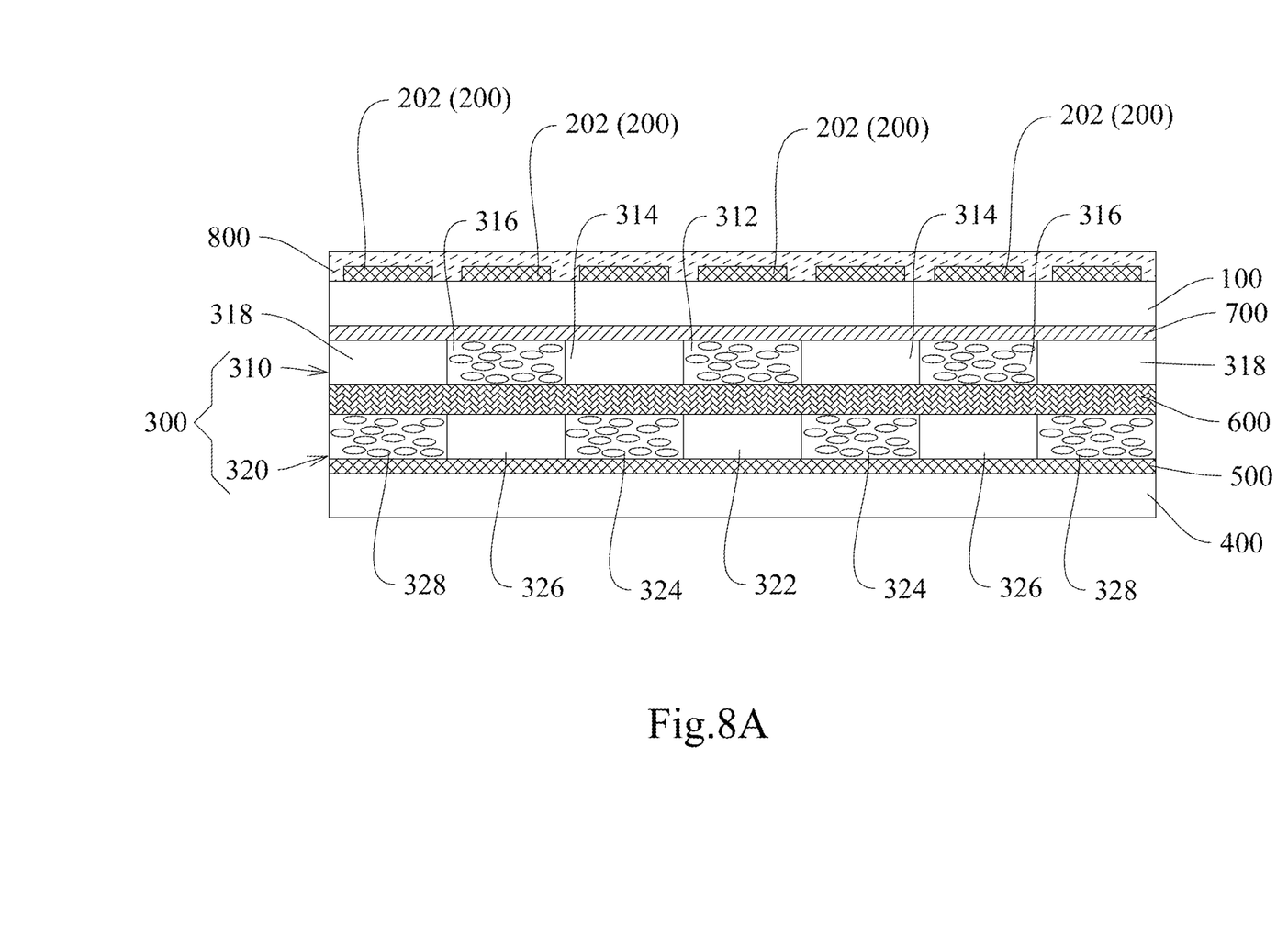
FIG. 8A and FIG. 8B are sectional views schematically showing the structures of LC lenses according to different embodiments of the present invention.
Figure 8B:
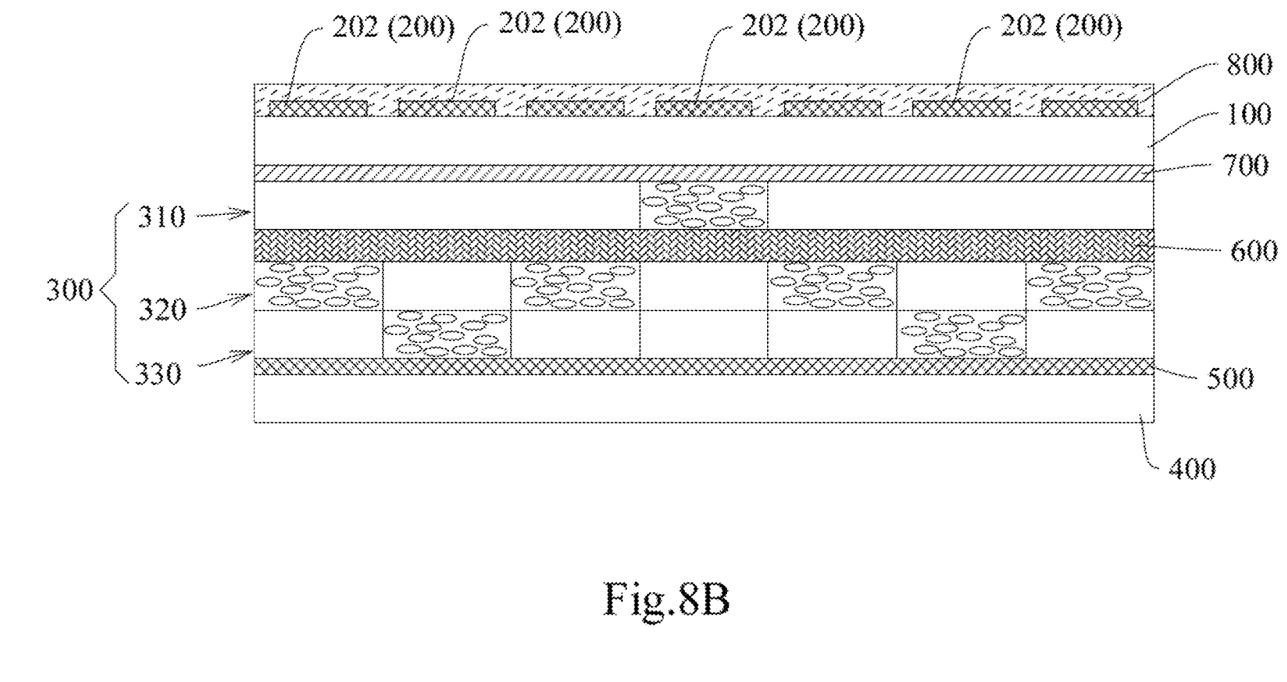

In yet another embodiment, at least one of the first electrode structure 200 and the second electrode structure 500 includes at least one electrode. As shown in FIG. 8A, the first electrode structure 200 includes a plurality of electrodes 202 for electrically tuning the LC units. In one embodiment, the LC lens of the present invention further comprises at least one impedance layer 800 directly arranged on or indirectly arranged above the first substrate 100 and/or the second substrate 400. According to the required electric field distribution, the impedance layer 800 has an impedance value ranging from 0.1M to 1000M Ohm/sq. As shown in FIG. 8A, the LC layer 310 includes a plurality of partition units, such as partition units 314 and partition units 318; the LC layer 320 includes a plurality of partition units, such as partition units 322 and partition units 326. Thus, the LC layer 310 is partitioned into a plurality of LC units, such as LC units 312 and LC units 316, and the LC layer 320 is partitioned into a plurality of LC units, such as LC units 324 and LC units 328. In one embodiment, the electrically tunable LC layer structure 300 includes a plurality of LC layers 310, 320 and 330, and the layouts of the LC units and the partition units are shown in FIG. 8B. The other characteristics of the embodiment shown in FIG. 8B are similar to those of the abovementioned embodiments and the details thereof will not be repeated herein.

Figure 9A:
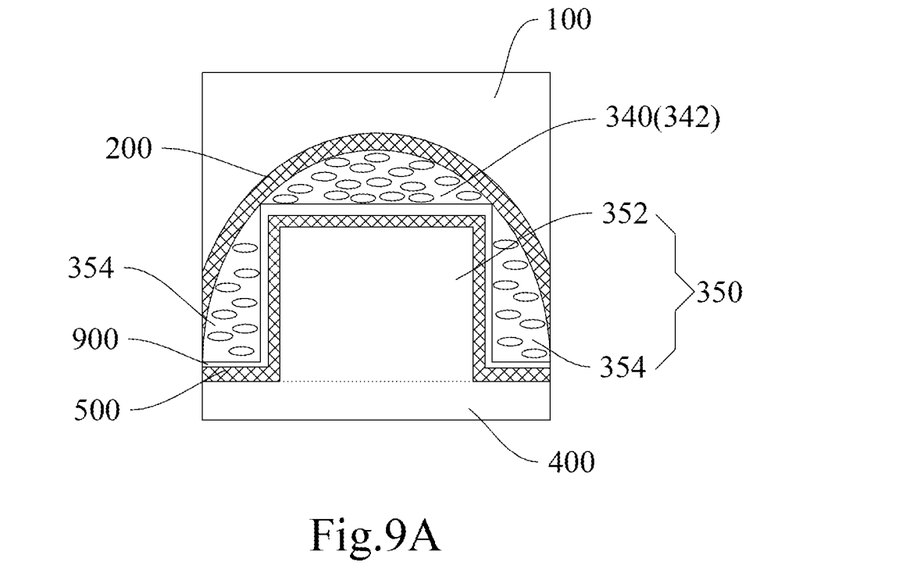
FIGS. 9A-9C are sectional views schematically showing the structures of LC lenses according to different embodiments of the present invention.

In the abovementioned embodiments, each LC unit has uniform thickness. In can be understood that each LC unit can also be designed to have non-uniform thickness. Even a portion of LC unit can be designed to have a uniform thickness and another portion of LC unit can be designed to be provided with a non-uniform thickness. In yet another embodiment, as shown in FIG. 9A, wherein each of the LC unit 342 of the upper LC layer 340 and the LC units 354 of the lower LC layer 350 has non-uniform thickness. In the embodiment shown in FIG. 9 A, the bottom surface of the first substrate 100 is curved to have a curvature, and the first substrate 100 hoods the LC layers to shape the LC units with a non-uniform thickness. In one embodiment, the partition unit 352 and the second substrate 400 can be configured into a one-piece component. Additionally, in the stacked structure, the upper LC layer 340 and the lower LC layer 350 respectively have different layouts of LC units. In order to achieve better control effect, the second electrode structure 500 is disposed above the second substrate 400 and set on the surface of the partition unit 352 with an insulation layer 900 lain on the second electrode structure 500 to protect the electrodes and insulate the electrodes from the first electrode structure 200. The other characteristics of the embodiment shown in FIG. 9A are similar to those of the abovementioned embodiments and will not be repeated herein.

Figure 9B:
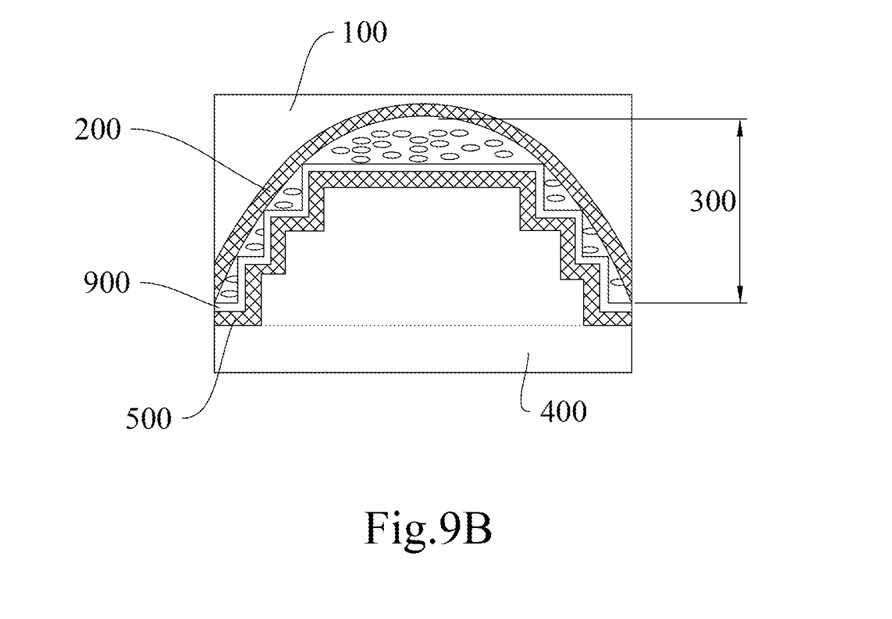
Figure 9C:
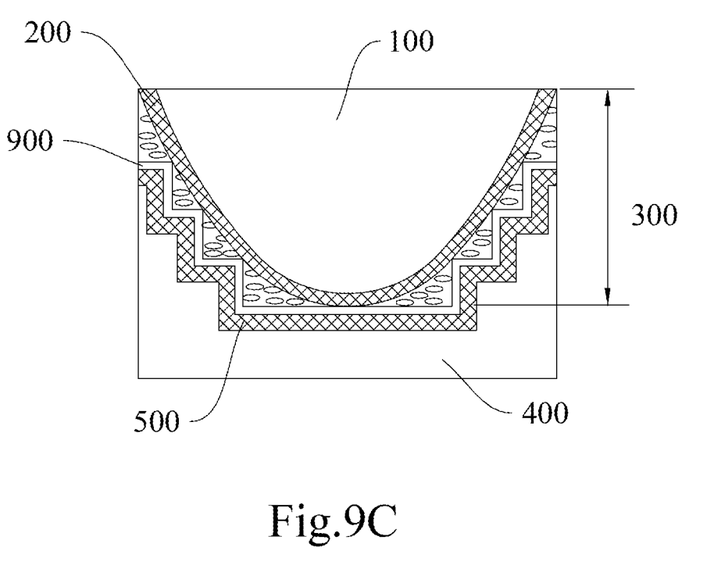

Continuously, in one embodiment, the partition unit is a laminated structure having varying height which is illustrated in FIGS. 9B and 9C. For an example, the laminated structure of the partition unit can be protruded from the first substrate or the second substrate, as shown in FIG. 9B. For a further example, the laminated structure of the partition unit is recessed toward the first substrate or the second substrate, as shown in FIG. 9C. The laminated structures shown in FIG. 9A and FIG. 9B have, but not limited to, right angles. The laminated structure having inclined planes or curved planes is also included within the scope of the present invention. In one embodiment, the partition unit and the first substrate can be fabricated into a one-piece component, and the second substrate has a curved surface. In another embodiment, the partition unit and the second substrate can be configured into a one-piece component, and the first substrate has a curved surface, as shown in FIG. 9B and FIG. 9C.

The present invention is to provide an element whose focus is electrically tunable, particularly to provide a liquid crystal lens with an electrically tunable refractive index. The present invention can be applied to imaging systems and projector systems, such as electrically tunable glasses, cameras, projectors, and endoscopes. Besides, the present invention is characterized in using two or more LC units to realize phase accumulation. Moreover, the present invention exempts the LC lens from only using a single LC unit and greatly expands the field of LC lens design. Furthermore, the present invention does not limit the shape of the LC unit but allows the LC unit to have uniform or non-uniform thickness. Additionally, in the present invention, the LC units of the upper LC layer partially superimpose the LC units of the lower LC layer or do not overlap the LC units of the lower LC layer. The present invention uses electrodes having desired patterns to replace the electrode layer, and the electrode has a single curvature or multiple curvatures according to the substrate where the electrode is disposed. The layout of the electrode structure is designed according to the layout of the LC units. Besides, the present invention arranges in the LC lens separation layers, impedance layers and alignment layers, which cooperate with the layout of the electrode structure to align liquid crystal or vary the electric field distribution. According to requirement, the present invention fabricates the partition units and the substrate into a one-piece component. In the present invention, a curved surface can be fabricated on the substrate, cooperating with the stepped partition units to partition the LC units. The present invention has a flexible structure and fabrication process and can apply to many fields.

In conclusion, the present invention proposes an LC lens structure, wherein the design of the shape and layout of the LC units enables the LC lens to achieve better optical performance without changing the thickness of the LC lens.

The embodiments have been described in detail to fully demonstrate the spirit and characteristics of the present invention. However, these embodiments are only to exemplify the present invention but not to limit the scope of the present invention. The specification of the present invention should be interpreted in the broadest sense. Any equivalent modification or variation according to the spirit or characteristic of the present invention is to be also included within the scope of the present invention.

What is claimed is:

1. A liquid crystal lens, comprises:
    a first substrate;
    a first electrode structure arranged on said first substrate;
    an electrically tunable liquid crystal layer structure arranged below said first substrate and including at least two liquid crystal layers stacked on top of one another, wherein each said liquid crystal layer further includes at least one liquid crystal unit, and wherein at least one of said liquid crystal layers has at least one partition unit to separate said liquid crystal layer into one or more said liquid crystal units; and said partition unit and said liquid crystal unit are not overlapped in each said liquid crystal layer, and wherein a layout of said liquid crystal units of said liquid crystal layer arranged above is different from a layout of said liquid crystal units of said liquid crystal layer arranged below;
    a second substrate arranged below said electrically tunable liquid crystal layer structure; and
    a second electrode structure arranged on said second substrate.

2. The liquid crystal lens according to claim 1, wherein said liquid crystal units and said partition units are in form of rings and disposed intermittently.

3. The liquid crystal lens according to claim 2, wherein said ring contains a plurality of sub-units.

4. The liquid crystal lens according to claim 3, wherein said liquid crystal unit or said partition unit at a central region has a shape of a circle, a polygon, or a combination of a circular and a polygon, and wherein said liquid crystal unit or said partition unit at a peripheral region has a shape of a circular ring, a polygonal ring, or a combination of a circular ring and a polygonal ring.

5. The liquid crystal lens according to claim 1, wherein said liquid crystal unit is made of at least one material selected from a group consisting of nematic liquid crystal, cholesteric liquid crystal, PDLC (Polymer Dispersed Liquid Crystal), and BPLC (Blue Phase Liquid Crystal).

6. The liquid crystal lens according to claim 1, wherein said partition unit is made of a plastic material or a glass material.

7. The liquid crystal lens according to claim 1, wherein said partition unit has different dielectric permittivities distributed thereon, and wherein said partition unit is made of a liquid crystal polymer film or of made of two or more dielectric materials.

8. The liquid crystal lens according to claim 1, further comprising a separation layer arranged between said at least two liquid crystal layers.

9. The liquid crystal lens according to claim 8, wherein said separation layer is made of a plastic material, a glass material or a liquid crystal polymer film.

10. The liquid crystal lens according to claim 1, further comprising an alignment layer set in said electrically tunable liquid crystal layer structure.

11. The liquid crystal lens according to claim 1, wherein at least one of said first electrode structure and said second electrode structure includes at least one electrode.

12. The liquid crystal lens according to claim 1, further comprising an impedance layer arranged on at least one of said first substrate and said second substrate.

13. The liquid crystal lens according to claim 12, wherein said impedance layer has an impedance value ranging from 0.1 M to 1000M Ohm/sq.

14. The liquid crystal lens according to claim 1, wherein a curvature is formed on a surface of said first substrate and/or a surface of said second substrate.

15. The liquid crystal lens according to claim 14, wherein said partition units and one of said first substrate and said second substrate is fabricated into a one-piece component.

16. The liquid crystal lens according to claim 1, wherein at least a portion of said liquid crystal units has non-uniform thickness.

17. The liquid crystal lens according to claim 16, wherein said partition unit is a laminated structure having varying height.

18. The liquid crystal lens according to claim 17, wherein said laminated structure having varying height is protruded from or recessed toward said first substrate or said second substrate.

19. The liquid crystal lens according to claim 16, wherein said partition units, said first substrate and said second substrate are fabricated in one of following methods: said partition unit and said first substrate are fabricated into a one-piece component, and said second substrate has a curved surface; said partition unit and said second substrate are fabricated into a one-piece component, and said first substrate has a curved surface.

* * * * *